United States Patent
Petersohn

(10) Patent No.: US 8,363,960 B2
(45) Date of Patent: Jan. 29, 2013

(54) METHOD AND DEVICE FOR SELECTION OF KEY-FRAMES FOR RETRIEVING PICTURE CONTENTS, AND METHOD AND DEVICE FOR TEMPORAL SEGMENTATION OF A SEQUENCE OF SUCCESSIVE VIDEO PICTURES OR A SHOT

(75) Inventor: Christian Petersohn, Berlin (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 989 days.

(21) Appl. No.: 12/052,453

(22) Filed: Mar. 20, 2008

(65) Prior Publication Data

US 2008/0232687 A1  Sep. 25, 2008

(30) Foreign Application Priority Data

Mar. 22, 2007  (DE) .......................... 10 2007 013 811

(51) Int. Cl.
*G06K 9/62* (2006.01)
(52) U.S. Cl. ........ 382/225; 348/700; 382/107; 382/170; 382/224; 382/232; 386/227; 386/241; 386/278; 715/723; 715/726
(58) Field of Classification Search .................. None
See application file for complete search history.

(56) References Cited

U.S. PATENT DOCUMENTS

| | | | | |
|---|---|---|---|---|
| 5,099,322 A | * | 3/1992 | Gove | 348/700 |
| 5,179,449 A | * | 1/1993 | Doi | 386/278 |
| 5,635,982 A | * | 6/1997 | Zhang et al. | 348/231.99 |
| 5,732,146 A | | 3/1998 | Yamada et al. | |
| 5,805,733 A | * | 9/1998 | Wang et al. | 382/232 |
| 5,828,809 A | * | 10/1998 | Chang et al. | 386/241 |
| 6,055,025 A | * | 4/2000 | Shahraray | 348/700 |
| 6,381,278 B1 | * | 4/2002 | Shin et al. | 375/240.16 |
| 6,404,925 B1 | * | 6/2002 | Foote et al. | 382/224 |
| 6,473,095 B1 | * | 10/2002 | Martino et al. | 715/726 |

(Continued)

FOREIGN PATENT DOCUMENTS

EP    1377047 A2    1/2004

OTHER PUBLICATIONS

Hong, Lu et al.; "Shot Boundary Detection using Unsupervised Clustering and Hypothesis Testing"; Jun. 27, 2004; Communications, Circuits and Systems, 2004. ICCCAS 2004. 2004 International Conference on Chengdu, China Jun. 27-29 2004. IEEE Piscataway, NJ, USA, ISBN: 978-0-7803-8647-1.

(Continued)

*Primary Examiner* — Tsung-Yin Tsai
(74) *Attorney, Agent, or Firm* — Michael A. Glenn; Glenn Patent Group

(57) ABSTRACT

Exemplary embodiments are described in which is performed not only a shot detection (continuous recording with a camera) and an association of several key-frames to the shots, it then being possible for a subsequent scene recognition to be based on the grouping of shots into scenes. Rather, it is observed that a scene only relates to one event in a setting. Since both can change within a shot, not every scene boundary is at the same time also a shot boundary. In addition, not every shot is short enough, so that a reliable retrieval of different picture contents is not guaranteed. Therefore, exemplary embodiments are shown which are capable of defining sub-shots so that in principle, scene and shot boundaries are also sub-shot boundaries at the same time. Sub-shots furthermore include only video pictures with a small change in picture content.

12 Claims, 6 Drawing Sheets

U.S. PATENT DOCUMENTS

| | | | |
|---|---|---|---|
| 6,690,725 B1 * | 2/2004 | Abdeljaoud et al. | 375/240.08 |
| 6,798,911 B1 * | 9/2004 | Jafarkhani et al. | 382/225 |
| 6,807,361 B1 * | 10/2004 | Girgensohn et al. | 386/227 |
| 7,035,435 B2 * | 4/2006 | Li et al. | 382/107 |
| 7,127,120 B2 | 10/2006 | Hua et al. | |
| 7,177,470 B2 * | 2/2007 | Jasinschi et al. | 382/170 |
| 2001/0016007 A1 | 8/2001 | Wu et al. | |
| 2004/0012623 A1 | 1/2004 | Yashiro et al. | |
| 2004/0090453 A1 * | 5/2004 | Jasinschi et al. | 345/723 |
| 2008/0127270 A1 * | 5/2008 | Shipman et al. | 725/46 |

OTHER PUBLICATIONS

Te-Won Lee, et al.; "Unsupervised Image Classification, Segmentation, and Enhancement Using ICA Mixture Models"; Mar. 1, 2002; IEEE Transactions on Image Processing, IEEE Service Center, Picscataway NJ, USA, vol. 11, No. 3.

Kobla, et al.; "Compressed domain video indexing techniques using DCT and motion vector information in MPEG video"; Feb. 13, 1997; Storage and Retrieval for Image and Video Databases 5. Proceedings of SPIE, vol. 3022, pp. 200-211.

Shahraray, Behzad; "Scene change detection and content-based sampling of video sequences"; Feb. 7, 1995; Proceedings of the SPIE, Bellingham, VA, vol. 2419, pp. 2-13, ISSN 0277-786X.

Coman, et al.; "Efficient Indexing of High Dimensional Normalized Histograms"; 2003; Lecture Notes in Computer Science, vol. 2736/2003, pp. 601-610.

Zhang, et al.; "An Integrated System for Content-Based Video Retrieval and Browsing"; 1997; Elsevier Science, Pattern Recognition, vol. 30, No. 4, pp. 643-658.

Zhuang, et al.; Adaptive Key Frame Extraction Using Unsupervised Clustering; 1998; IEEE Proceedings Image Processing (ICIP) 98, pp. 866-870.

Yeung, eta l.; "Time-Constrained Clustering for Segmentation of Video Inot Story Unites"; 1996; IEEE Computer Society, Proc. of the Int;l Conference on Pattern Recognition (ICPR 96), vol. 3, pp. 375-380, ISBN: 0-8186-7282-X.

Wolf, Wayne; "Key frame selection by Motion Analysis"; 1996, IEEE Int'l Conference on Acoustics, Speech, and Signal Processing (ICASSP-96), vol. 2, pp. 1228-1231.

Zhang, et al."Automatic Partitioning of Full-Motion Video"; 1993; Multimedia Systems vol. 1, pp. 10-28, Springer.

Hoashi, K., et al. (KDDI R&D Laboratories Inc.); "Shot Boundary Determination on MPEG Compresssed Domain and Story Segmentation Experiments for TRECVID 2004"; TREC Video Retrieval Evaluation Online Proceedings, TRECVID 2004.

Kang, et al.; "An Effective Method for Video Segmentation and Sub-Shot Characterization"; ICASSP 2002, Poc. vol. 4, pp. IV-3652-3655.

Maeda, J.; "Method for Extracting Camera Operations in Order to Describe Subscenes in Video Sequences"; May 1994; Proc. SPIE—vol. 2187, Digital vdeo Compression on Personal Computers: Algorithms and Technologies, pp. 56-67.

Lienhart, Rainer; "Comparison of Automatic Shot Boundary Detection Algorithms"; undated; Microcomputer Research Labs, Intel Corp., Santa Clara CA.

Petersohn, Christian; "Fraunhofer HHI at TRECVID 2004: Shot Boundary Detection System"; undated; Fraunhofer Institute for Telecommunications, Heinrich-Hertz-Institut, Berlin Germany.

Petersohn, C.; "Dissolve Shot Boundary Determination"; undated; Frunhofer Institute for Telecommunication, Heinrich-Hertz-Institut, Berlin Germany.

Petersohn, Christian; "Wipe Shot Boundary Determination"; undated; Fraunhofer Institute for Telecommunications, Heinrich-Hertz-Institut, Berlin Germany.

Sundaram, et al.; "Determining Computable Scenes in Films and their Structures using Audio-Visual Memory Models"; 2000; Proc. 8th ACM Multimedia Conf. Los Angeles, CA.

Treetasanatavorn, et al.;; "Temporal Video Segmentation Using Global Motion Estimation and Discrete Curve Evolution"; Oct. 2004; Proc. IEEE ICIP, International Conference on Image Processing, Singapore, pp. 385-388.

Zhuang, et al.; "Adaptive Key Frame Extraction Using Unsupervised Clustering"; 1998; IEEE Proceedings, Image Processing (ICIP 1998), pp. 866-870.

Title: A Tutorial on Clustering Algorithms, Clustering: An Introduction; website: http://home.dei.polimi.it/matteucc/Clustering/tutorial_html; received Aug. 5, 2011; pp. 1-4.

Title: Cluster Analysis; from Wikipedia; website:http://en.wikipedia.org/wiki/Cluster_analysis; received Aug. 5, 2011; pp. 1-16.

Stepenosky, N. et al., "Majority Vote and Decision Template Based Ensemble Classifiers Trained on Event Related Potentials for Early Diagnosis of Alzheimer's Disease", IEEE Int'l Conf. on Acoustics, Speech and Signal Processing (ICASSP), Toulouse, France, May 2006, pp. V-901-V-904.

Theodoridis, S. et al., "Pattern Recognition", Chapter 4: Nonlinear Classifiers, Elsevier, USA, Apr. 2006, pp. 182-185.

* cited by examiner

METHOD AND DEVICE FOR SELECTION OF KEY-FRAMES FOR RETRIEVING PICTURE CONTENTS, AND METHOD AND DEVICE FOR TEMPORAL SEGMENTATION OF A SEQUENCE OF SUCCESSIVE VIDEO PICTURES OR A SHOT

CROSS-REFERENCE TO RELATED APPLICATIONS

This application claims priority from German Patent Application No. 10 2007 013 811.5, which was filed on Mar. 22, 2007, and is incorporated herein in its entirety by reference.

TECHNICAL FIELD

The invention relates to the selection of key-frames for retrieving picture contents as well as the temporal video segmentation. Exemplary embodiments relate for example to a method for temporal segmentation of a video into video-picture sequences and for selecting key-frames for retrieving picture contents. In the exemplary embodiments are partially included the process steps of temporal segmentation of the video into individual shots, each shot including a sequence of successive video pictures, which were taken continuously with one camera act, and the key-frame selection with an association of key-frames representing the picture content with the video-picture sequences of the determined time segments, these two process steps being known in the state of the art as set forth below.

BACKGROUND

Video is a comprehensive source of information. The individual video pictures are however not subjected to any intrinsic order for example as predefined by the alphabet for letters. Therefore, different forms of description, for example by means of color or edge histograms or face descriptors, were used for identifying video pictures, such descriptors taking into consideration at a low level only one single aspect of the video picture which is very complex as regards its contents. Even higher-order descriptors take into consideration only the aspects of a video picture for which they were designed.

For video analysis and indexing, three main questions are basically to be clarified:
Which temporal units should be indexed?
How should the units be indexed?
Which index should be designated by which label?

For representation, abstraction, navigation, search and retrieval of video contents, the automatic recognition of temporal video structure is an important prerequisite. The units can be indexed only after a temporal video segmentation. If the hierarchical structure of a video is used for this purpose, the search can occur in a way analogous to the search in a book or magazine with chapters, sections, paragraphs, sentences and words. Video can contain different modalities. Beside the visual content of the pictures, the auditory content (music, voice, noises, etc.) and an accompanying text can also be present. The lowest hierarchical level of the temporal structure of a video forms the only video picture for the visual content, one single scanning for the auditory content and a letter or a word for the text content. In the present application however, only the segmentation and retrieval of the visual content are addressed.

At a higher level, there are the so-called "shots", which are defined as a sequence of successive video pictures taken by a single camera act without interruption. There are different algorithms detecting both abrupt and gradual shot boundaries. Shots adjacent in time form a "scene" (in the present application, this term is used for a higher-order unit in a finished film and not as a synonym for shots). A scene is defined by one single event, which takes place in a continuous setting during a continuous time period. Algorithms for the segmentation of a video into scenes often operate on the visual similarity between individual shots, because shots in the same setting often exhibit the same visual properties. At the highest level are the programs, for example feature films, newscasts, documentary films, series or home videos. Search algorithms for retrieving individual news stories or commercials fade-ins also already exist. Between the program level and the scene level is partly defined another "sequence level". This term should not be confused with the term "sequence of video pictures" for example as the content of a shot.

Scenes are defined as events which take place within a continuous time period in a setting (scene: an event in a setting). Shots are continuously taken in a continuous time period by a camera and are comprised of a corresponding sequence of video pictures. By means of continuous camera panning, the setting and thus the scene in a shot can change, however. Since the event and the setting can change within a shot, each scene boundary is not also a shot boundary at the same time. In other words, a scene can also contain only parts of a shot. Hence, the picture content within a shot can also be very different. Therefore, several key-frames (key pictures) are presently also generally associated with a shot for the detection of the content. For the selection of the key-frames (key-frame selection), several algorithms are also well-known from the state of the art.

Until now, automatic temporal segmentation of a video or a video sequence normally has occurred in two steps. First, the shot boundaries are detected in order to obtain a segmentation at shot level. For the determined shots several key-frames are then usually selected for a characteristic display of the picture content. Then, in a third process step, groups of adjacent shots are grouped into scenes, in order to obtain a segmentation at scene level. The grouping of adjacent shots into scenes is however only an approximation, since scene boundaries within shots cannot be taken into consideration in the segmentation.

From the state of the art, one has known algorithms for identifying and defining scenes which are generally based on the detection of shot boundaries. Some documents, however, also deal with the use of sub-shots in detection.

In U.S. Pat. No. 7,127,120 B2 is described a system, which reads video and audio material and automatically generates a summary in the form of a new video. To this end, beside shots, sub-shots are also extracted as temporal video segments in the original video, in order not to have to use complete shots in the summary. The aim of the sub-shot extraction is here neither the discovery of reasonable key-frames for shots nor the discovery of potential scene boundaries within a shot, but the definition of segments, which can later on be used in the video summary. The method described by way of an example for sub-shot extraction is based on the analysis of picture differences between two adjacent pictures (Frame Difference Curve, FDC). Long-term changes, which can result into both strong oversegmentation and undersegmentation, are however ignored. Therefore, the sub-shots used in U.S. Pat. No. 7,127,120 B2 are not suitable for discovering as few key-frames as possible, but representative key-frames, for shots (key-frame selection problem). In addition, it is not guaranteed that scene boundaries within shots are also sub-shot boundaries in the meaning of U.S. Pat. No. 7,127,120 B2. A definition of scenes based on sub-shots is not provided.

From publication I of H. Sundaram et al.: "Determining Computable Scenes in Film and their Structures using Audio-Visual Memory Models" (Proc. $8^{th}$ ACM Multimedia Conf., Los Angeles, Calif., 2000) it is known to identify scenes by means of so-called "shotlets". The shots are, irrespectively of their visual content, simply divided into sections ("shotlets") of a length of one second. This is a very simple approach with low additional complexity for the algorithm for discovering the sub-shot boundaries. Scene boundaries within shots can thus be found automatically. Because of the rigid rule for forming the shotlets, a strong oversegmentation is however obtained in visually static shots with only slightly changing video material. Therefore, no solution for the problem of association of relevant key-frames to shotlets is provided in Publication I.

Furthermore, from publication II of K. Hoashi et al. (KDDI Laboratories): "Shot Boundary Determination on MPEG Compressed Domain and Story Segmentation Experiments for TRECVID 2004" (TREC Video Retrieval Evaluation Online Proceedings, TRECVID, 2004) it is known to set, during the presentation of the news cast, additional points for potential scene boundaries in shots when the speech of the newscaster is interrupted. This kind of further subdivision works however only for newscasts or similarly construed broadcasts. In publication III of S. Treetasanatavorn et al.: "Temporal Video Segmentation Using Global Motion Estimation and Discrete Curve Evolution" (Proc. IEEE ICIP, International Conference on Image Processing, pages 385-388, Singapore, October 2004) are defined segments of shots, which are based on the consistency of motion between adjacent video pictures. These motion segments are used to describe the camera motion within a shot. In a prior publication IV of J. Maeda: "Method for extracting camera operations in order to describe sub-scenes in video sequences" (Proc. SPIE—volume 2187, Digital Video Compression on Personal Computers: Algorithms and Technologies, pages 56-67, May 1994), similar segments are defined and referred to as "sub-scenes". Such a segmentation serves for describing a motion. It is however not suited for describing segments with different visual content.

In the state of the art, the problems of a suitable scene recognition and definition, which is not based on shot boundaries, and of a suitable key-frame selection for the segments found are so far addressed separately. Generally, one or several key-frames per shot are most often selected based on the segmentation results of the shot detection.

In publication V of Zhuang et al.: "Adaptive key frame extraction using unsupervised clustering" in Proc. IEEE Int. Conf. Image Processing pp. 866-870, Chicago, Ill., 1998) it is provided to cluster all the pictures of a shot and to then use the cluster centers as key-frames. Temporal segments are however not defined. On the contrary, the clusters do not have to correspond with temporal segments. An example would be a shot in which the camera pans from person A to person B and then again to person A. For this shot comprised of three segments, two clusters would be formed, one cluster for person A, one cluster for person B, and two key-frames would be selected accordingly. Temporal connections between the key-frames of a shot are thus lost here. In publication VI of J. Kang et al.: "An Effective Method For Video Segmentation And Sub-Shot Characterization" ICASSP 2002, Proc. Vol. 4, pages IV-3652-3655), sub-shots are also referred to as parts of a shot with homogeneous motion properties (e.g. a coherent zoom or pan). The motion in a shot can thus be described per segment.

In publication VII of Zhang et al.: "An integrated system for content-based video retrieval and browsing" (Pattern Recognition, vol. 30, no. 4, pages 643-658, 1997) is presented an approach for selecting key-frames for a shot. It is observed that a shot cannot be reasonably represented by only one key-frame. Therefore, besides the first picture of a shot, further pictures are possibly selected as key-frames. This occurs by means of two methods (a simple comparison of the visual similarity between individual pictures and global motion analysis for determining camera motions). The key-frame selection is thus indeed performed depending on the video content, but no segments (sub-shots) are defined, which could subsequently be used for scene definition. In addition, at least the first picture of a shot is used as a key-frame. This picture is however unfavorable in particular with gradual shot transitions (fade-out, fade-in, cross-fade, wipe), since it poorly represents the shot.

A method for the key-frame selection also for sub-shots is known from US 2004/0012623 and is regarded as the closest state of the art for the invention. Sensors within the video camera provide data on the rotation of the camera in the x- and/or y-direction. In addition, the use of the zoom switch is logged by the user on the video camera. Based on these data regarding the camera motion, the starting points of pivotal (Pan) and zoom motions of the video camera are defined as sub-shot boundaries within shots. Key-frames are then determined for the sub-shots depending on the camera motion data. A prerequisite for the method is thus that the camera motion data are logged by the camera for the video sequence and are available. Furthermore, exclusively camera motions result into additional sub-shots and thus into additional key-frames. Local motions of objects or other effects in already edited videos are ignored. Thus, not all relevant changes are taken into consideration for the key-frame selection.

SUMMARY

According to an embodiment, a method for selecting key-frames for retrieving picture contents of a video may have the steps of: a) temporal segmentation of the video into individual shots, each shot including a sequence of successive video pictures taken by a single camera act without interruption, b) temporal segmentation of each shot into individual sub-shots, so that each sub-shot includes a sequence of successive video pictures of the shot that exhibits only a small change in picture content, by performing one of the following algorithms: a threshold-value algorithm including approximating the picture content of a video picture by means of a measurable picture property, calculating the change in picture content by means of a distance function for the measurable picture property of two video pictures F and F', F being the first video picture of a sub-shot and F' designating a video picture stepwise further removed from F by one picture and placing a sub-shot boundary when reaching a predefined threshold value for the distance in several successive video pictures F', the boundary being placed before the first one of these video pictures, a cluster algorithm including applying a clustering to the video pictures of a shot without taking into consideration the temporal order of the video pictures and using a measurable picture property of the video pictures, in order to assign the video pictures of the shot to different cluster labels in accordance with their measurable picture property; local filtering of the assigned cluster labels so that a number of changes in cluster labeling is reduced along the temporal order of the video pictures, and after the local filtering, placing sub-shot boundaries at locations of a change in cluster labeling in the temporal order of the video pictures, or a motion algorithm including determining, for continuous pairs of video pictures of a shot, a mean displacement by which the pixels of a video picture are displaced with respect to the respective other video picture of the pair of video pictures, using a motion-vector field between video pictures of the respective continuous pair of video pictures, specifically for one or several directions of motion, in order to obtain a temporal series of displacement values per direction of motion, filtering the temporal series of displacement values of the one or several directions of motion by means of a low-pass filter in order to obtain filtered displacement values per direction of motion, an amount of the displacement value or a sum of the amounts of the displacement values of the one or several directions of motion for the individual video pictures of the shot defining an overall displacement D, forming a sum $\Box$D of the overall displacements D of all video pictures of the shot, and dividing the shot into ($\Box$D/ th$_d$ sub-shots, th$_d$ being a predefined limit value, so that in each sub-shot, the sum of the overall displacements D is the same as much as possible, and c) performing a key-frame selection by associating, with the respective sub-shot, exactly one key-frame from the video pictures of the respective sub-shot, said key-frame representing the picture content of the respective sub-shot, for each sub-shot.

According to another embodiment, a method for temporal segmentation of a sequence of successive video pictures into shorter video sections that have little visual variation may have the steps of: applying a clustering to the video pictures without taking into consideration the temporal order of the video pictures and using a measurable picture property of the video pictures, in order to assign the video pictures to different cluster labels in accordance with their measurable picture property; local filtering of the assigned cluster labels so that a number of changes in cluster labeling is reduced along the temporal order of the video pictures, and after the local filtering, placing segment boundaries at locations of a change in cluster labeling in the temporal order of the video pictures.

According to another embodiment, a method for temporal segmentation of a shot into individual sub-shots, wherein the shot includes a sequence of successive video pictures taken continuously by a single camera act without interruption, and specifically such that each sub-shot includes a sequence of successive video pictures of the shot that exhibits only a small change in picture content, may have the steps of: determining, for continuous pairs of video pictures of a shot, a mean displacement by which the pixels of a video picture are displaced with respect to the respective other video picture of the pair of video pictures, using a motion-vector field between video pictures of the respective continuous pair of video pictures, specifically for one or several directions of motion, in order to obtain a temporal series of displacement values per direction of motion, filtering the temporal series of displacement values of the one or several directions of motion by means of a low-pass filter in order to obtain filtered displacement values per direction of motion, an amount of the displacement value or a sum of the amounts of the displacement values of the one or several directions of motion for the individual video pictures of the shot defining an overall displacement D, forming a sum $\Box$D of the overall displacements D of all video pictures of the shot, and dividing the shot into ($\Box$D/ th$_d$ sub-shots, th$_d$ being a predefined limit value, so that in each sub-shot, the sum of the overall displacements D is the same as much as possible. According to another embodiment, a device for selecting key-frames for retrieving picture contents may have: a) a segmenter for temporal segmentation of the video into individual shots, each shot including a sequence of successive video pictures taken by a single camera act without interruption, b) a segmenter for temporal segmentation of each shot into individual sub-shots, so that each sub-shot includes a sequence of successive video pictures of the shot that exhibits only a small change in picture content, by performing one of the following algorithms: a threshold-value algorithm including approximating the picture content of a video picture by means of a measurable picture property, calculating the change in picture content by means of a distance function for the measurable picture property of two video pictures F and F', F being the first video picture of a sub-shot and F' designating a video picture stepwise further removed from F by one picture and placing a sub-shot boundary when reaching a predefined threshold value for the distance in several successive video pictures F', the boundary being placed before the first one of these video pictures, a cluster algorithm including applying a clustering to the video pictures of a shot without taking into consideration the temporal order of the video pictures and using a measurable picture property of the video pictures, in order to assign the video pictures of the shot to different cluster labels in accordance with their measurable picture property; local filtering of the assigned cluster labels so that a number of changes in cluster labeling is reduced along the temporal order of the video pictures, and after the local filtering, placing sub-shot boundaries at locations of a change in cluster labeling in the temporal order of the video pictures, or a motion algorithm including determining, for continuous pairs of video pictures of a shot, a mean displacement by which the pixels of a video picture are displaced with respect to the respective other video picture of the pair of video pictures, using a motion-vector field between video pictures of the respective continuous pair of video pictures, specifically for one or several directions of motion, in order to obtain a temporal series of displacement values per direction of motion, filtering the temporal series of displacement values of the one or several directions of motion by means of a low-pass filter in order to obtain filtered displacement values per direction of motion, an amount of the displacement value or a sum of the amounts of the displacement values of the one or several directions of motion for the individual video pictures of the shot defining an overall displacement D, forming a sum $\Sigma$D of the overall displacements D of all video pictures of the shot, and dividing the shot into ($\Sigma$D)/th$_d$ sub-shots, th$_d$ being a predefined limit value, so that in each sub-shot, the sum of the overall displacements D is the same as much as possible, and c) a key-frame selector for performing a key-frame selection by associating, with the respective sub-shot, exactly one key-frame from the video pictures of the respective sub-shot, said key-frame representing the picture content of the respective sub-shot, for each sub-shot.

According to another embodiment, a device for temporal segmentation of a sequence of successive video pictures into shorter video sections with a small visual variation may have: a clusterer for applying a clustering to the video pictures without taking into consideration the temporal order of the video pictures and using a measurable picture property of the video pictures, in order to assign the video pictures to different cluster labels in accordance with their measurable picture property; a filter for local filtering of the assigned cluster labels so that a number of changes in cluster labeling is reduced along the temporal order of the video pictures, and a boundary segmenter for placing, after the local filtering, placing segment boundaries at locations of a change in cluster labeling in the temporal order of the video pictures.

According to another embodiment, a device for temporal segmentation of a shot into individual sub-shots, wherein the shot includes a sequence of successive video pictures taken continuously by a single camera act without interruption, and specifically such that each sub-shot includes a sequence of successive video pictures of the shot that exhibits only a small change in picture content, may have: a determiner for determining, for continuous pairs of video pictures of a shot, a mean displacement by which the pixels of a video picture are displaced with respect to the respective other video picture of the pair of video pictures, using a motion-vector field between video pictures of the respective continuous pair of video pictures, specifically for one or several directions of motion, in order to obtain a temporal series of displacement values per direction of motion, a filter for filtering the temporal series of displacement values of the one or several directions of motion by means of a low-pass filter in order to obtain filtered displacement values per direction of motion, an amount of the displacement value or a sum of the amounts of the displacement values of the one or several directions of motion for the individual video pictures of the shot defining an overall displacement D, a summer for forming a sum $\Box$D of the overall displacements D of all video pictures of the shot, and a divider for dividing the shot into ($\Box$D/ $th_d$ sub-shots, $th_d$ being a predefined limit value, so that in each sub-shot, the sum of the overall displacements D is the same as much as possible.

According to another embodiment, a computer-readable medium on which is stored a computer program may have a program code for performing the method for selecting key-frames for retrieving picture contents of a video may have: a) temporal segmentation of the video into individual shots, each shot including a sequence of successive video pictures taken by a single camera act without interruption, b) temporal segmentation of each shot into individual sub-shots, so that each sub-shot includes a sequence of successive video pictures of the shot that exhibits only a small change in picture content, by performing one of the following algorithms: a threshold-value algorithm including approximating the picture content of a video picture by means of a measurable picture property, calculating the change in picture content by means of a distance function for the measurable picture property of two video pictures F and F', F being the first video picture of a sub-shot and F' designating a video picture step-wise further removed from F by one picture and placing a sub-shot boundary when reaching a predefined threshold value for the distance in several successive video pictures F', the boundary being placed before the first one of these video pictures, a cluster algorithm including applying a clustering to the video pictures of a shot without taking into consideration the temporal order of the video pictures and using a measurable picture property of the video pictures, in order to assign the video pictures of the shot to different cluster labels in accordance with their measurable picture property; local filtering of the assigned cluster labels so that a number of changes in cluster labeling is reduced along the temporal order of the video pictures, and after the local filtering, placing sub-shot boundaries at locations of a change in cluster labeling in the temporal order of the video pictures, or a motion algorithm including determining, for continuous pairs of video pictures of a shot, a mean displacement by which the pixels of a video picture are displaced with respect to the respective other video picture of the pair of video pictures, using a motion-vector field between video pictures of the respective continuous pair of video pictures, specifically for one or several directions of motion, in order to obtain a temporal series of displacement values per direction of motion, filtering the temporal series of displacement values of the one or several directions of motion by means of a low-pass filter in order to obtain filtered displacement values per direction of motion, an amount of the displacement value or a sum of the amounts of the displacement values of the one or several directions of motion for the individual video pictures of the shot defining an overall displacement D, forming a sum $\Sigma$D of the overall displacements D of all video pictures of the shot, and dividing the shot into ($\Sigma$D)/$th_d$ sub-shots, $th_d$ being a predefined limit value, so that in each sub-shot, the sum of the overall displacements D is the same as much as possible, and c) performing a key-frame selection by associating, with the respective sub-shot, exactly one key-frame from the video pictures of the respective sub-shot, said key-frame representing the picture content of the respective sub-shot, for each sub-shot when the computer program runs on a computer and/or a corresponding digital or analog component.

According to another embodiment, a computer-readable medium, on which is stored a computer program may have a program code for performing the method for temporal segmentation of a sequence of successive video pictures into shorter video sections that have little visual variation, the method may have the steps of: applying a clustering to the video pictures without taking into consideration the temporal order of the video pictures and using a measurable picture property of the video pictures, in order to assign the video pictures to different cluster labels in accordance with their measurable picture property; local filtering of the assigned cluster labels so that a number of changes in cluster labeling is reduced along the temporal order of the video pictures, and after the local filtering, placing segment boundaries at locations of a change in cluster labeling in the temporal order of the video pictures when the computer program runs on a computer and/or a corresponding digital or analog component.

According to another embodiment, a computer-readable medium, on which is stored a computer program may have a program code for performing the method for temporal segmentation of a shot into individual sub-shots, wherein the shot includes a sequence of successive video pictures taken continuously by a single camera act without interruption, and specifically such that each sub-shot includes a sequence of successive video pictures of the shot that exhibits only a small change in picture content, the method may have: determining, for continuous pairs of video pictures of a shot, a mean displacement by which the pixels of a video picture are displaced with respect to the respective other video picture of the pair of video pictures, using a motion-vector field between video pictures of the respective continuous pair of video pictures, specifically for one or several directions of motion, in order to obtain a temporal series of displacement values per direction of motion, filtering the temporal series of displacement values of the one or several directions of motion by means of a low-pass filter in order to obtain filtered displacement values per direction of motion, an amount of the displacement value or a sum of the amounts of the displacement values of the one or several directions of motion for the individual video pictures of the shot defining an overall displacement D, forming a sum $\Sigma$D of the overall displacements D of all video pictures of the shot, and dividing the shot into ($\Sigma$D)/$th_d$ sub-shots, $th_d$ being a predefined limit value, so that in each sub-shot, the sum of the overall displacements D is the same as much as possible when the computer program runs on a computer and/or a corresponding digital or analog component.

In exemplary embodiments is described a temporal segmentation of a video into video picture sequences and selection by key-frames for retrieving picture contents, which allow defining and automatically segmenting in time special video picture sequences obtained by special segmentation so that both shots and scenes consist of one or more such special temporally successive video picture sequences. Therefore, shot boundaries and scene boundaries fall on boundaries of video picture sequences. This means that the special video picture sequences used can also be used for scene definition, without same including scene boundaries. Despite using as few special video picture sequences as possible, it is at the same time however guaranteed that one single video picture (key-frame) per special video picture sequence is enough to comprehensively represent its picture content. Furthermore, the temporal segmentation into the special video picture sequences is however so easy that algorithms for discovering their boundaries can easily and reliably be converted. Only little information is necessary for establishing the boundaries.

In accordance with exemplary embodiments, the special video picture sequences are defined in the form of sub-shots. The procedure in accordance with these exemplary embodiments is divided into three sections: first of all, a shot detection known per se is performed for the video and/or for individual video sequences. Then, the determined shots are adequately segmented into sub-shots, sub-shot boundaries being inserted after large long-term changes in the picture content, so that both scene and shot boundaries are at the same time sub-shot boundaries. Various algorithms of different complexity can be used for discovering the sub-shot boundaries. Then, exactly one key-frame characteristic for the picture content is associated with each sub-shot.

The definition of the sub-shots formed in accordance with the above exemplary embodiments reads: "a sub-shot is a sequence of successive video pictures showing an event taken by a single camera act without interruption in one single continuous setting with only a small change in the picture content." The definition of a sub-shots in accordance with these exemplary embodiments is thus basically the definition of a shot with the two restrictions of the definition of a scene, which limit a sub-shot to a setting and an event. In addition, another restriction is however also included in the definition: only small changes in the picture content are allowed. It is thus guaranteed that sub-shots are short video segments with a small visual variation.

In accordance with exemplary embodiments, after the sub-shot segmentation exactly one key-frame is then associated with each sub-shot. The sub-shot segmentation re-defined by the invention has two important advantages compared with the well-known segmentation. All potential scene transitions are marked with the sub-shot boundaries, so that the sub-shots are the basic elements of each scene. At the same time, the sub-shots are also the basic elements of a shot, since all shot boundaries are also used as sub-shot boundaries. Through this segmentation, it is firmly guaranteed that both sequence and shot boundaries are at the same time sub-shot boundaries. The sub-shot boundaries thus indicate the boundaries of each event and the boundaries of each setting. In addition, further sub-shot boundaries can be present in both the scenes and the shots. The sub-shots thus represent the smallest possible segmentation unit as a special video picture sequence, in which is guaranteed that similar picture contents with only small changes are clustered. Thanks to this optimal segmentation, exactly one characteristic key-frame can be associated with each sub-shot for archiving, wherefore the basic association problem is solved. The differences in content in the video sequence are safely recorded without information loss, but also without oversegmentation by the generated sub-shots. The temporal order and the number of sub-shots are clearly recorded thanks to the temporal order and the number of associated key-frames. Therefore, the selected key-frames are outstandingly suitable for an analysis, a browsing, an indexing and a search in the video.

According to the exemplary embodiments, in which the shots are segmented, the sub-shots are sections of individual shots, because they also include only sequences of pictures of one single camera act. Therefore, after the shot boundaries have been found with a shot-detection algorithm, each shot can be divided with a further algorithm into one or several sub-shots. Both algorithms can advantageously also be performed synchronously for a simultaneous superposed segmentation. It is furthermore advantageous that at the beginning or at the end of a shot, when the latter exhibits a gradual transition to the adjacent shots, no further segmentation into sub-shots is performed within the shot transition, in order to avoid too strong a segmentation in these areas. Thanks to the measure, calculation time can in addition be saved for the preparation of the picture contents.

An event is a semantic concept. Although much has already been invested in the study of the semantic understanding, an event and highlight detection depends basically on the definition and is thus difficult to be converted.

Therefore, boundaries between events are presently assimilated with a change in setting and/or in picture content, for example, when persons enter into the scene or leave it. Discovering all the changes in setting and in picture content thus also guarantees, as a rule, the discovery of all boundaries between different events. The setting can be changed during a camera act only through a motion of the camera with respect to the setting, e.g. by moving the camera from one area to another area. However, since various settings are generally also visually different from each other, not only motions, but also differences in picture content can be used for detecting potential changes in setting. Such changes in picture content can be detected using simple picture properties, for example color or edge histograms can be used. Other picture properties can however also be used. In the particular description portion are described various algorithms of different complexity, which are suitable for the segmentation of videos or video sequences into sub-shots or into shorter sequences in accordance with the invention and are based on histograms or motion analysis. The sub-shot detection is performed with a threshold-value algorithm, a cluster algorithm and/or a motion algorithm, the difference between simple picture properties of successive video pictures being determined by the threshold values, the limit values or tolerable errors, the size for the admissible small change indicated in same. The maximum allowed "small changes in picture content" in the definition of a sub-shot can purposefully be set by these values. By means of the amount of the predefined values, the user has thus an influence on the size of the allowed small changes.

BRIEF DESCRIPTION OF THE DRAWINGS

Embodiments of the present invention will be detailed subsequently referring to the appended drawings, in which.

DETAILED DESCRIPTION

Figure 1:
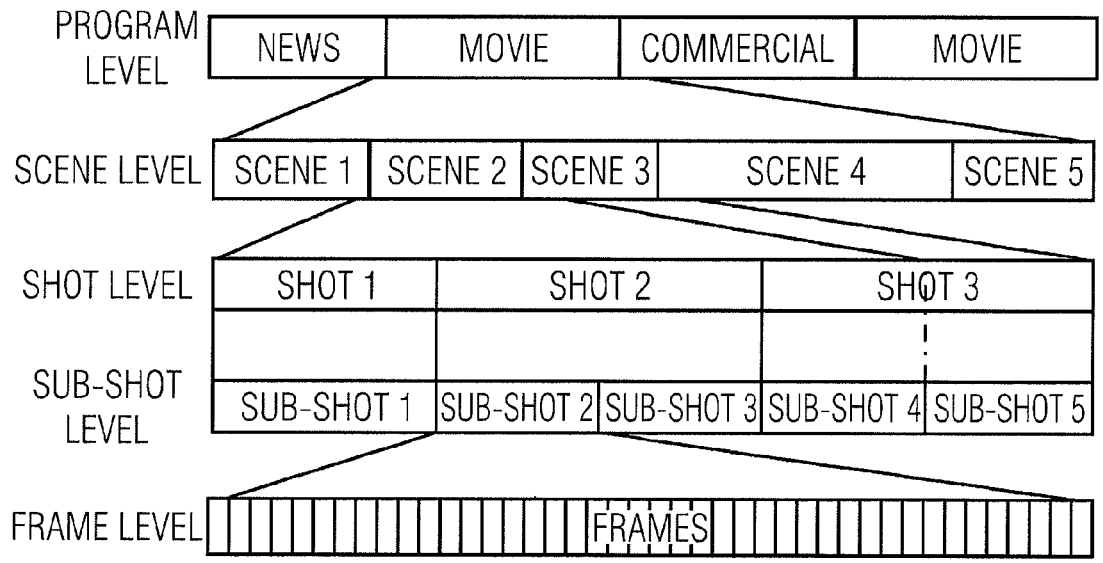
FIG. 1 shows a diagram of the various levels in a video program.

FIG. 1 shows the hierarchy of the various representation levels using a segmentation method in accordance with an exemplary embodiment described hereinafter. At program level, different programs, for example feature films, newscasts, commercials, are proposed. Each program, for example a feature film, is divided into a plurality (indicated by oblique lines) of scenes, which form the scene level. A scene is defined by one single event, which takes place in a continuous setting during a continuous period of time. A shot is defined as a sequence of successive video pictures, which have been taken by a continuous camera act. Therefore, a change in setting through a camera motion results into a change of scene in the video, but not to a change of shot.

In FIG. 1 is shown that the scene boundary between scene 2 and 3 does not coincide with a shot boundary. In the segmentation method in accordance with the invention, a further level is incorporated below the shot level: the sub-shot level. One can see, on the one hand, that each scene boundary and also each shot boundary is at the same time also a sub-shot boundary. Furthermore, one can also see that there are further sub-shot boundaries in a shot. A sub-shot is defined in accordance with the invention as a continuous picture sequence of a camera act at a location with a small change of the picture content. It can thus be guaranteed with the invention that, on the one hand, there are no scene boundaries in a sub-shot, i.e. that each scene boundary is also a sub-shot boundary and that sub-shots can thus be clearly associated with individual scenes, and that, on the other hand, exactly one key-frame ("key picture") is representative for each sub-shot. The key-frame is selected from the lowest hierarchy level: the image plane, in which all individual video pictures are arranged. A possibility of key-frame selection would be for example to use the first, the central or the last picture of a sub-shot. Further selection criteria are possible.

According to an exemplary embodiment of the key-frame selection and the video segmentation, a shot detection is performed as the first process step. Discovering shot boundaries is generally well-known from the state of the art and is described for example in the following publications, the content of which is expressly incorporated, through citing same, in the publication content of the present invention.

Publication VIII: C Petersohn. "Fraunhofer HHI at TRECVID 2004: Shot Boundary Detection System", TREC Video Retrieval Evaluation Online Proceedings, TRECVID, 2004, Publication IX: C Petersohn. "Dissolve Shot Boundary Determination", Proc. IEE European Workshop on the Integration of Knowledge, Semantics and Digital Media Technology, pp. 87-94, London, UK, 2004, Publication X: C Petersohn. "Wipe Shot Boundary Determination", Proc. IS&T/SPIE Electronic Imaging 2005, Storage and Retrieval Methods and Applications for Multimedia, pp. 337-346, San Jose, Calif., 2005 and Publication XI: R. Lienhart. "Comparison of Automatic Shot Boundary Detection Algorithms." Proc. SPIE Storage and Retrieval for Image and Video Databases VII, vol. 3656, p. 290-301, 1999.

As a last process step of the method is performed a key-frame selection with an association of exactly one key-frame ("key picture") fully representing the picture content to each detected sub-shot. This can be any video picture whatsoever of the sub-shot, since it has as a matter of fact a fixed length, in accordance with the invention, so that all video pictures it contains have very similar picture content. For example, the central video picture in a sub-shot can be selected as a key-frame.

The second process step includes the sub-shot detection, which can be performed in accordance with various algorithms for determining the difference in picture content between successive video pictures. Hereinafter, three different algorithms of different complexity are cited as algorithms that can be used.

Threshold-Value Algorithm

This simple algorithm measures the long-term changes in picture content. If these long-term changes exceed a threshold value, a sub-shot boundary is inserted. Here "long-term" means that picture changes are measured and evaluated not only between adjacent video pictures, but also between video pictures distant from each other in time. The picture content is approximated by a measurable picture property. This can be e.g. a color histogram, an edge histogram or also a picture descriptor in accordance with the MPEG-7 standard.

There exist further possibilities. In order to quantify the change in picture content, a distance function is applied to the measured picture properties of two pictures. The use of histograms is now described by way of an example.

Histograms with a different number of quantization steps and in different color spaces, for example YUV or HSV color space, can be used. The three channels can be interpreted separately or as three-dimensional vectors. Best results are obtained when the color values of the pixels in the HSV color space, the parameters H (Hue) and S (saturation) are interpreted as two-dimensional vectors and used for a histogram with 16 by 16 bars. The grey value V (Value) is ignored, because it is very sensitive to changes in brightness. Each of the 16 by 16 bars then represents the number of pixels in a picture, the color value of which is comprised within a determined range—different for each bar.

The necessary distance function for the histograms as measurable picture property is based on histogram intersection. The distance d between the histograms of two pictures F and F' is defined as:

$$d = 1 - \frac{1}{pc}\sum_{i=1}^{k} \min(H(F, i), H(F', i)) \quad (1)$$

with pc=number of pixels used for creating the histogram
i=run index
k=number of bars
H(F,i)=$i^{th}$ bar of the histogram of video picture F (number of
pixels with color value within the $i^{th}$ range)
min=minimum In a 16×16 bar histogram, k=256. The distance function has a value range of [0,1]. The smaller the distance between two pictures, the more the pictures are similar to each other.

Figure 2:
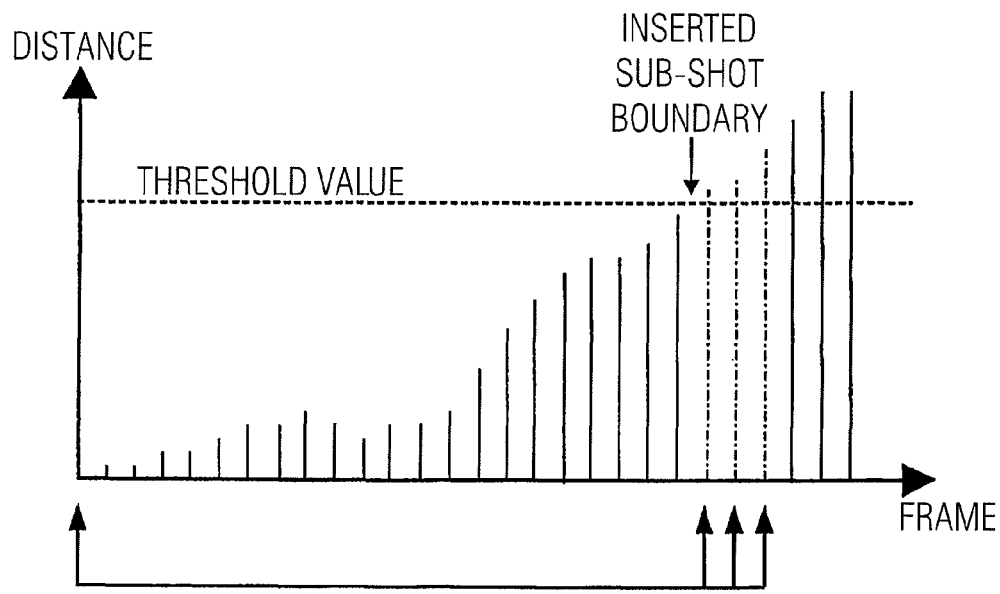
FIG. 2 shows a diagram of the threshold-value algorithm.

In this simple threshold-value algorithm, the first video picture (frame) in a shot or the first video picture after a gradual transition is used as reference picture. Afterwards is formed the distance between the histograms of this reference picture and each following video picture. If the distance exceeds, for example in three successive video pictures, a predefined threshold value (e.g. 0.3), a sub-shot boundary is inserted before these three video pictures. The first of the three video pictures then becomes the new reference picture (cf. FIG. 2).

The advantage with this algorithm resides in its small complexity. The error rate is however relatively high, because short-term disturbances, such as individual deviating pictures, for example due to flashlights, pictures changed at short term or objects moving very fast at the foreground, can give rise to errors. This is of course attenuated through the comparison between three successive pictures, but can however not be completely prevented. In addition, it would be desirable to place the sub-shot boundaries in the center of a change. This can however not be guaranteed with the described procedure. Therefore, the application of the threshold-value algorithm serves more for determining a starting position. In practice, this algorithm will rather not be used.

Cluster Algorithm

Through using a cluster algorithm with a clustering of picture descriptors, errors in detection due to individual deviating pictures can be reduced and sub-shot boundaries can be arranged centrally. The proposed cluster algorithm also detects sub-shot boundaries based on the analysis of the change in picture content. The same measurable picture properties as with the threshold-value algorithm can be used. A possibility would thus be, here too, e.g. the use of a 16×16 bar histogram in the HSV color space. Well-known cluster methods are the k-means algorithm and the hierarchical clustering. In the detection method in accordance with the invention, the k-means cluster method, which is simple and robust, provided the best results.

The k-means cluster algorithm exists in two versions. It can either be applied to vectors in the Euclidean space or use arbitrary properties, when there exists mathematical metrics and a distance function, which defines the distance between two marked areas of the property used. The distance function in accordance with equation (1) meets these requirements. Many other measurable picture properties and distance functions can be used.

For the detection method, measurable picture properties are used, which can be interpreted directly as a vector in the Euclidean space. Two methods can be used for the association of a vector to the pictures. For the example of the 16×16 bar histogram in the HSV color space, the 256 bars in the histogram can be used in two ways. They must however be previously present in a standardized form, i.e. they are divided by the number of pixels in the picture, so that the sum of all 256 bars of a histogram is 1. Then, the bars can be interpreted, on the one hand, directly as vector components. This results into a vector in the 256-dimensional space. On the other hand, the high number of dimensions can first of all be reduced by multi-dimensional scaling (MDS), in order to use vectors with fewer dimensions for the clustering. The first method using directly all the bars in a histogram provided the best results during the trial run.

Depending on the change in picture content in a shot, a corresponding change of the number of sub-shots necessary and thus of the number of clusters, which describe a shot is obtained. Special parameters, such as the black or Akaike information criterion, can be used for forming clusters. Better is a method, which fixes the maximum tolerable error after clustering (cluster error, e.g. 0.1). The k-means algorithm is implemented several times with an increasing number of clusters. A higher number of clusters results into smaller clusters and, therefore, to smaller average distances between the vectors and the respective cluster center. The time differences between the individual pictures are neglected during the clustering.

Afterwards, the temporal order is used for associating the individual cluster labels to the sub-shot boundaries. Two filters are used for taking into consideration "outlier pictures" and fluctuations of the cluster label. A majority vote filtering is first of all performed: a minority cluster label for a video picture i is transposed in the majority cluster label to the video pictures that are located x video pictures before and after the video picture i. The parameter x is determined by experience and can be for example 2 (cf. FIG. 3, above: before filtering, down: after filtering). With the second filter is guaranteed that sub-shots have a minimal length of k, for example 10, pictures. If the same cluster label were associated with less than k successive pictures, these pictures have associated with them the cluster label that the pictures of the segment before or after have, depending on the pictures with respect to which they have a smaller average distance according to equation 1. After the filtering, the sub-shot boundaries are placed in temporal order at locations of change in the cluster labels (cf. FIG. 4). The cluster method is more robust to outlier pictures than the threshold-value method. A further advantage is that, based on the special cluster calculation of k-means, the cluster transitions, and therefore the sub-shot boundaries, are positioned centrally in the case of image changes.

Motion Algorithm

Changes in the setting within a shot are generated by a camera motion, whereas changes in an event or in the picture content can be generated both by a camera motion and by an object motion. The third algorithm proposed uses therefore the motion analysis for determining the sub-shot boundaries.

To this end, in a first step is determined the motion vector field between consecutive pairs of pictures. To this end can be used a block matching, applied for example to blocks with 8×8 pixels. For coded (for example in accordance with the MPEG standard) video sequences, the motion vectors can also be used for coding, wherefore the computational complexity is reduced.

However, not all determined motion vectors represent also a real motion. For example, the motion vectors $mv(i,j)$ for blocks $(i,j)$ with small content details cannot be determined reliably. Therefore, in the motion algorithm used here, the motion vectors of blocks with a pixel-intensity variance below a predefined limit value are neglected (see $m(i,j)$).

In order to be able to indicate the quantity of change between two pictures is introduced the term "displacement". This allows indicating the mean quantity by which the pixels of a picture have been displaced with respect to the size of the picture and with respect to the following picture. The displacement is determined separately for three directions of motion. These are the horizontal (h) and the vertical (v) direction of motion as well as the zoom direction (z), in which occur simultaneously a horizontal, a vertical and an oblique motion directed towards the corners of the picture (cf. FIG. 5).

The same indexing applies to the motion vectors. The displacements are calculated as follows:

$$D_h = \frac{\sum_{i,j} m(i,j)mv(i,j) \cdot v_h(i,j)}{\sum_{i,j} m(i,j)|v_h(i,j)|\text{Width}}$$

$$D_v = \frac{\sum_{i,j} m(i,j)mv(i,j) \cdot v_v(i,j)}{\sum_{i,j} m(i,j)|v_v(i,j)|\text{Height}}$$

$$D_z = \frac{\sum_{i,j} m(i,j)mv(i,j) \cdot v_z(i,j)}{\sum_{i,j} m(i,j)|v_z(i,j)|\sqrt{\text{Width}*\text{Height}}}$$

with $D_h$=horizontal displacement
  $D_v$=vertical displacement
  $D_z$=displacement due to zoom
  i,j=block indices
  m(i, j)=matrix=1 for an intensity variance of the pixels in the block above the predefined limit value
    =0 for an intensity variance of the pixels in the block below the predefined limit value
  mv(i, j)=motion vector of block (i,j)
  $v_{\{h,v,z\}}(i,j)$=vector field, which is different depending on the direction of motion as shown in FIG. 5a-c
  $|v_{\{h,v,z\}}(i,j)|$=length of the vector and/or model vector $v_{\{h,v,z\}}(i,j)$
    =1 for each block with at least one Vector $v_{\{h,v,z\}}$ (see FIG. 5a-c)
    =0 for each block outside of the rows and columns considered as well as in the zoom center (see FIG. 5a-c),
  •=scalar product.

The temporal series of such displacement values must then be filtered by a mean-value filter, in order to remove high-frequency noise. High-frequency noise develops e.g. during bad camera guidance (shaking) or when an actor moves back and forth, so that a large motion indeed arises, but no large long-term change in picture content. With the mean-value filter for example all displacement values are considered half a second before and half a second after the respective current displacement value. Without filtering, too large values would be calculated in the further evolution for the overall displacement, so that too large a number of necessary sub-shots would result. The filtered displacements for the three directions are defined by:

$$D_{dir,filt}(i) = \frac{1}{2*k+1} \sum_{j=i-k}^{j=i+k} D_{dir}(j)$$

with
  dir=one of the three directions of motion (h-horizontal, v-vertical, z-zoom),
  k=number of displacement values before and after the displacement value of the currently considered pair of pictures,
  i=number of the currently considered pair of pictures and
  j=run index.
The number of displacement values before and after the displacement value of the currently considered pair of pictures depends on the picture repeat rate of the video and can e.g. be selected so that it corresponds to half the picture repeat rate.

The so determined displacements $D_{h,filt}$, $D_{v,filt}$, $D_{z,filt}$ are then added to obtain an overall displacement D, which represents the height of the camera and/or object motion between two temporally adjacent pictures:

$$D=|D_{h,filt}|+|D_{v,filt}|+s*|D_{z,filt}|$$

with s=scaling factor for the zoom, e.g. s=1.

The absolute value of the displacements for the individual directions must be used, since the filtered displacements are oriented. That means e.g. for the vertical displacement that up and down motions generate different signs in the displacement. On the other hand, the overall displacement D is no longer oriented and describes only the overall displacement between two pictures irrespective of their direction. For the sequence of pictures in a shot, their overall displacements can then also be added to form a sum ΣD. When the value of this sum is above a determined limit value $th_d$, for example $th_d$=0.5, one or several sub-shot boundaries are inserted into the corresponding shot. An overall displacement ΣD of 0.5 means that the pixels in the pictures of the shot are displaced as an average by half of the picture width or picture height in the corresponding direction. The number #ssb of sub-shot boundaries to be inserted can then be calculated by:

$$\#ssb=\Sigma D/th_d$$

Afterwards, the locations of the sub-shot boundaries to be inserted are fixed so that each sub-shot has associated with it the same amount of the summed overall displacement ΣD. In order to reduce the error rate, sub-shot boundaries are however inserted only when a predefined minimum change in picture content $th_{min}$ arises. Therefore, the distance with respect to the picture properties according to equation 1 between the first and the last picture of the current sub-shot must be larger than $th_{min}$, with e.g. $th_{min}$=0.1. The advantage of the motion algorithm resides in that the sub-shot boundaries can very easily be found by means of the motion analysis. The motion is an important describing property for the picture content, because the motion is the main reason for changes in picture content. In contrast, the computational complexity is relatively large, but can however be handled quite well. However, other properties, which cause a change in picture content, cannot be detected with the motion analysis. Therefore, it is particularly advantageous that, for example, the cluster algorithm and the motion algorithm are combined.

Test Results

In order to be able to evaluate the efficiency of the three described algorithms and to be able to reasonably adjust the described parameters, including the threshold values, tests have been performed on a series of video sequences. To this end, the number and position of reasonable sub-shot boundaries were marked for each shot. It was thus decided manually by a human being when a change in event took place, when a setting was abandoned and/or when a change of picture was large enough to cause a sub-shot boundary to become necessary. Then different parameters were tested for the three algorithms and the respective segmentation quality was determined.

In automatic segmentation, manually determined sub-shot boundaries can either be found (k—correct), not be found (ng—not found) or further sub-shot boundaries can falsely be added (fh—falsely added). The number of k, ng and fh are designated by # k, # ng and # fh. As an evaluation measure for the segmentation quality, two variables are used: The proportion of correctly recalled sub-shot boundaries and the proportion of the correct sub-shot boundaries in the sub-shot boundaries found (precision). They are defined as follows:

$$\text{Recall} = \frac{\#k}{\#k + \#ng}$$

$$\text{Precision} = \frac{\#k}{\#k + \#fh}$$

Values of 0.9 for recall and precision mean for example that 9 out of 10 manually marked sub-shot boundaries were found to be correct, 1 was not found and 1 was falsely inserted. This would already mean a relatively good segmentation. A perfect, error-free segmentation would achieve values of 1.0 for recall and precision. By changing the parameters for the three algorithms, different values for recall and precision can be achieved. For an algorithm, an increase of the recall value by changing the parameters most often results into a reduction of the precision value.

Figure 6:
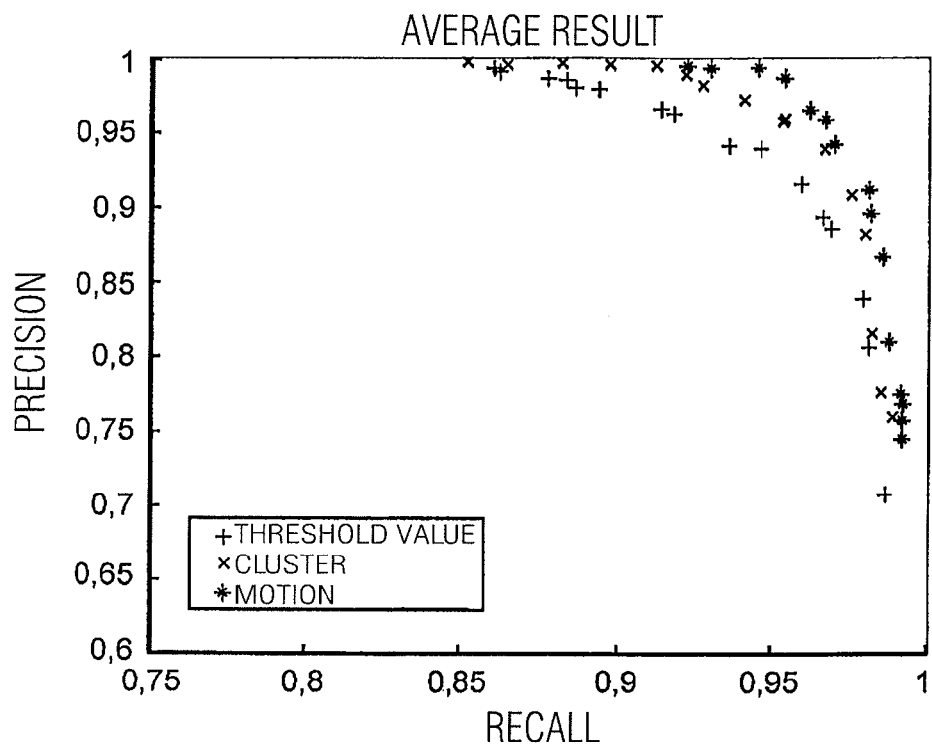
FIG. 6 shows a diagram of the segmentation quality of the three algorithms.

FIG. 6 shows the results of the segmentation quality of the method described above for a large span of parameters with the three algorithms. The parameter values mentioned in the exemplary embodiments apply to parameter values, with which recall and precision are about equally high. When comparing the three algorithms in FIG. 6, one can observe that the segmentation quality of the motion algorithm is the best, that of the threshold-value algorithm is the worst. In general, the segmentation quality of the method in accordance with the invention is however at a high level.

In the above exemplary embodiments are performed not only a shot detection (continuous recording by a camera) and an association of several key-frames to the shots, whereby a successive scene recognition can then be based on the clustering of shots into scenes. It is rather observed that a scene regards only one event in a setting. Since both can change within a shot, not every scene boundary is at the same time also a shot boundary. Furthermore, not every shot is short enough, so that more reliable retrieval of different picture contents is not guaranteed. Therefore, in the above-described methods sub-shots are additionally inserted and defined so that scene and short boundaries are basically at the same time also sub-shot boundaries. Sub-shots include, in addition, only video pictures with a small change in picture content. It can thus indeed be guaranteed that, with a view to reliably retrieving picture contents, only exactly one key-frame should be associated with each sub-shot. Scenes can then be described accurately by clustering of successive sub-shots. Sub-shot detection can be performed by means of various algorithms, for example threshold-value, cluster and/or motion algorithm.

Thus, in other words, in accordance with the above embodiments, sub-Shots are treated as the basic units of a video rather than shots or scenes. In even other words, since scene boundaries can occur within shots, a new level in the hierarchy of temporal video segments named sub-shots is proposed in the above embodiments. Sub-shots are parts of shots. They are restricted to one event and limited to only a small change in visual content. The determination of scenes can then be based upon sub-shots. Sub-shots can also be used for key-frame extraction. Especially, two algorithms, a clustering approach based on visual content and a motion analysis algorithm have been described and yielded experimentally promising results.

The above embodiments may be used in the automatic discovery of temporal video structure which is an important prerequisite for video visualization, abstraction, navigation, search and retrieval. When a hierarchical structure is employed, it is possible for users to browse through video similar to the way they can browse text with chapters and paragraphs in books and magazines. Rather than regarding shots as the segments on the video hierarchy level above frames sub-shots are used in the above embodiments. Shots are defined as a sequence of consecutive frames taken by a single camera act. There are several algorithms to detect abrupt and gradual shot boundaries as indicated in the background section.

Scenes are defined to be events in a continuous time period and to take place in one setting. Shots on the other hand only have to be recorded in a continuous time period since they consist of consecutive frames taken by a single camera act. Within a shot, the setting might change due to camera motion. That means, when someone walks from one room to another and the camera is moved to a new location, it is often considered two separate scenes in the script as, for example, in S. Ascher und E. Pincus. "The Filmmaker's Handbook: A Comprehensive Guide for the digital Age", Plume, N.Y., March 1999, depending on whether the rooms are considered two separate settings. Consequently scene changes can occur within shots. One good example is the movie "The Player" by Robert Altman. In the beginning it has a shot of about eight minutes duration where the camera is flying over the ground showing different locations, indoors and outdoors, following several characters and conversations. Another example is news stories which can be regarded as scenes constituting the news cast. Often the topic changes within an anchor shot with the anchor person concluding the last and starting the next news story. The above embodiments take this possibility into account by an extension of the hierarchy of temporal video segments by sub-shots. These sub-shots may be defined as follows: a sub-shot is a sequence of consecutive frames showing one event or part thereof taken by a single camera act in one setting with only a small change in visual content. The above presented sub-shots are defined in a way that shots as well as scenes consist of entire sub-shots. That means scene boundaries and shot boundaries are sub-shot boundaries at the same time. Additionally the definition only allows small change in visual content. This ensures that sub-shots are small pieces of video that only have little visual variation. FIG. 1 showed a segmentation example in the hierarchy for temporal video segmentation with sub-shots.

As had also been described above, sub-shots in accordance with the above embodiments only have little visual variation, and, therefore, a single key-frame may represent a sub-shot well without loosing much of the visual information. A shot may then be represented by the key-frames of all sub-shots it contains.

There are tow advantages in using the level of sub-shots in the hierarchy of temporal video segments of the above embodiments. 1) Sub-shot boundaries mark all possible transitions between scenes and thus sub-shots are the building blocks of scenes. And 2) using one key-frame from each sub-shot very well solves the key-frame selection problem since a) all visually different segments of a shot are represented. And b) the temporal ordering and number of segments is represented by the key-frames. Thus the key-frames are very well suited for video analysis, browsing, indexing and search.

The above embodiments for sub-shot segmentation have been studied in praxis. They resulted in sub-shots which are restricted to one event, one setting and only a small change in visual content. An event changes when a character leaves or enters the scenery, e.g. The setting can be changed inside a shot by moving the camera. A change in visual content may be caused by object as well as by camera motion. Different settings and different characters usually also differ visually from each other. Among the practised embodiments, one was based on color histograms and uses clustering, the other one was based on motion analysis. Further, the above mentioned thresholding algorithm has also been practised. All practised algorithms thus segment shots into sub-shots after a shot detection algorithm marked all abrupt and gradual shot transitions. If a shot starts or ends with a gradual transition, the transitional frames were not searched for sub-shot boundaries.

The thresholding embodiment was practised the following way. Distances between color histograms of different frames in the shot were used to detect sub-shot boundaries by the change in visual content. The hue (H) and saturation (S) channels from HSV were used to calculate a 16 by 16 bin histogram. The value (V)-channel have been ignored since it is very sensitive to changes in lighting. Histogram intersection has been used as the distance measure. The first frame of a shot or the first frame after a gradual transition has been used as a reference frame, with the distance between the histograms of this reference frame and each succeeding frame being calculated and, if the distances to three succeeding frames all exceeded a predefined threshold, a sub-shot boundary being inserted before the first of those three frames (see FIG. 2), and the first of those three frames becoming the new reference frame. Three frames have been used to be robust against one and two frame outliers, e.g. caused by flashlights.

In practising the clustering embodiment, the change in visual content was analysed. The same HSV-histograms were as in thresholding. As clustering algorithms k-means clustering and hierarchical clustering were tested. Better results were reached using k-means. Depending on the variation in visual content in a shot, a different number of sub-shots and thus a different number of clusters was appropriate for that shot. A parameter was used defining the maximum average residual error accepted after clustering. That limits the average distance of a point to its cluster center. Running k-means with an increasing cluster count leads to a decreasing clustering error. The temporal distances between frames are ignored during clustering. The temporal order is used afterwards to get from the assignment of cluster labels to sub-shot boundaries. Two filters have been used to filter outliers and to eliminate fluctuations of label assignments: First a majority vote filter changes the cluster assignment of frame i into the cluster label which the majority of the frames i−x to i+x is assigned to, see FIG. 3. Parameter x may be determined during training. The second filter described above was used as well. It makes sub-shots to have a minimum length "k" of e.g. ten frames. That means, if the same cluster label is assigned to less than "k" consecutive frames, these frames are assigned the cluster label of the segment of frames temporally before or after which they are in average more similar to. Similarity may be measured using histogram intersection. After filtering a sub-shot boundary was inserted for each change in cluster label assignments in the temporal order of the frames, FIG. 4. In summarization, the algorithm tested had the following steps:

1) Calculate frame feature descriptors (HSV-histogram)
2) Run k-means with increasing cluster count starting from 1 until residual error is smaller than threshold
3) Run majority vote filtering
4) Merge temporal segments that are too short
5) Mark sub-shot boundaries The algorithm is more robust to outliers compared to the practised thresholding algorithm. It also centers sub-shot boundaries within the temporal zones of visual change. However, it is also computationally more complex with increasing shot size.

Figure 5:
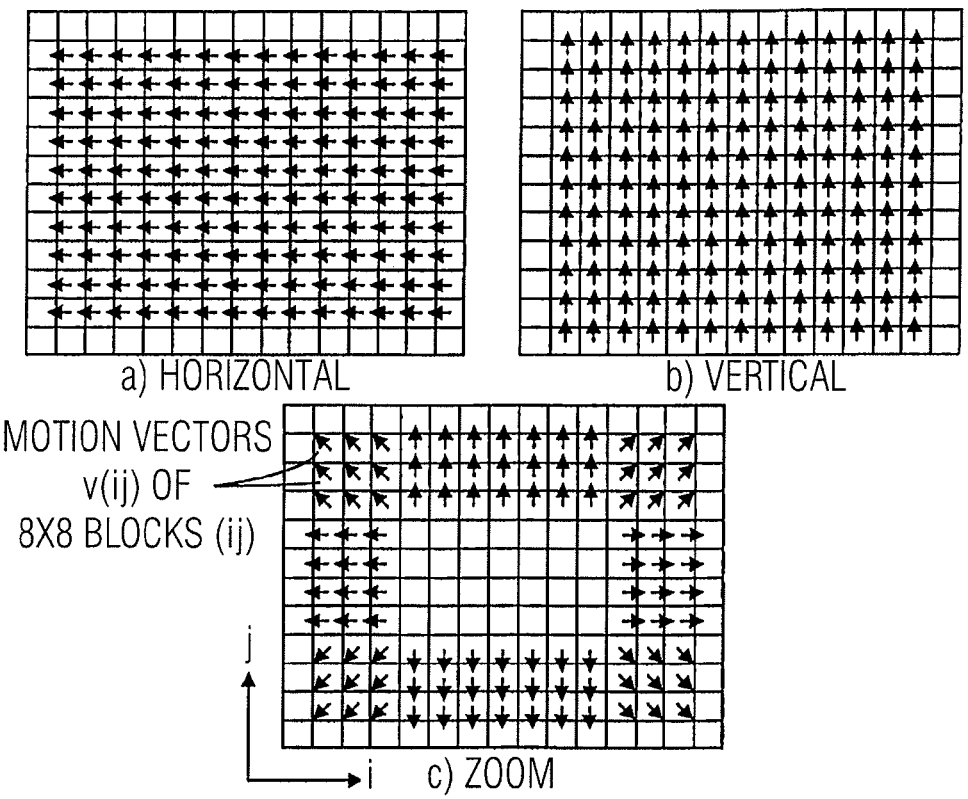
FIG. 5 shows a schematic diagram of the motion directions of the pixels in the motion algorithm.

Further, the motion analysis embodiment has been practiced. The latter uses motion analysis to determine sub-shot boundaries. In a first step, the motion vector field for blocks of 8×8 pixel was determined, e.g. by block matching. However, not all resulting motion vectors represent real motion. Especially for blocks with little spatial detail the motion vectors are not necessarily reliable. Therefore, in the proposed algorithm motion vectors of blocks with a pixel intensity variance smaller than a threshold have been ignored. To measure the amount of change between two frames the "displacement" was determined, i.e. how much the pixels of the image have moved in average relative to the size of the image. FIG. 5 illustrates the motion vector fields for three motion models. The calculated motion vector field was compared with each of the model motion vector fields and three corresponding displacement values were calculated. Then the three values were combined to an overall displacement value representing the amount of camera and/or object motion between two temporally adjacent frames. The displacement values for a series of frames were added to get an overall displacement $\Sigma D$, wherein a displacement of 0.5, e.g., would, for example, mean that the pixels of the image have been moved in average by half the picture width or height in the corresponding direction. The number of sub-shot boundaries to be inserted were calculated to be #ssb=$\Sigma D/th_d$. Finally the positions of the boundaries were determined so that there is an equal amount of displacement in each new sub-shot. In summary, the algorithm practiced and tested had the following steps for the segmentation of a shot:

1) Determine motion vectors (MVs)
2) Filter out unreliable MVs based on variance of pixel intensity of block
3) Calculate average MVs for horizontal and vertical motion and zoom
4) Calculate displacement for every two adjacent frames
5) Calculate overall displacement for shot
6) Calculate number of sub-shot boundaries to be inserted
7) Insert sub-shot boundaries equally spaced in accordance with displacement but only if minimum change in visual content occurred The advantage of this algorithm is that it robustly finds sub-shot boundaries caused by motion. This is an important feature since motion is the main cause for the need for temporal segmentation of shots into sub-shots. Disadvantages are the high computational complexity of the block matching algorithm used for calculation of MVs.

A ground truth was manually created to experimentally verify the tested algorithms. Exact sub-shot boundary positions cannot be objectively defined. Therefore the ground truth consists of temporal regions, e.g. for pans or zooms, with a minimum and a maximum number of allowed sub-shot boundaries in that region. If less than the minimum number of sub-shot boundaries were detected in a region, the missing ones were counted. Sub-shot boundaries additional to the maximum allowed number or outside of regions were counted as false positive. The number of correctly detected sub-shot boundaries plus the number of shots was counted as correctly handled because for shots that do not have to be segmented any further a sub-shot detection method doing no further segmentation works correctly. Recall and precision values could then be used for the evaluation.

For the test set, videos from three different genres have been used. Details are shown in Table 1:

| Set | Name | Length in min | #Shots | Min # Sub-shots | Max # Sub-shots |
|---|---|---|---|---|---|
| 1 | News | 43 | 578 | 672 | 757 |
| 2 | Feature film | 19 | 90 | 201 | 231 |
| 3 | Sitcom | 63 | 749 | 815 | 850 |
| | Total | 125 | 1417 | 1688 | 1838 |

A leave-one-out approach had been used for training and testing. FIG. 6 shows the test results. Best results are reached by the approach using motion analysis. Clustering performs second best, simple thresholding worst.

Recall values go up to 0.98 and 0.99 for the different approaches. The approach using motion analysis can inherently not detect changes of content in shots that are not accompanied by motion, e.g. when the background image used in a news anchor shot is changed. The other two algorithms miss sub-shot boundaries if the camera or object motion is not causing considerable differences in the color histogram used. Over segmentation on the other hand can be caused by camera or object motion that covers or uncovers areas of distinct color content. A more detailed analysis of the test results showed that the clustering approach handled noise and outliers such as varying lighting conditions and flashlights much better than the base-line thresholding algorithm. However, the motion analysis approach outperformed both other approaches for all parts of the test sets.

The results may be improved by combining the clustering and motion analysis approaches because they both use different assumptions limiting the maximum possible recall.

Figure 7:
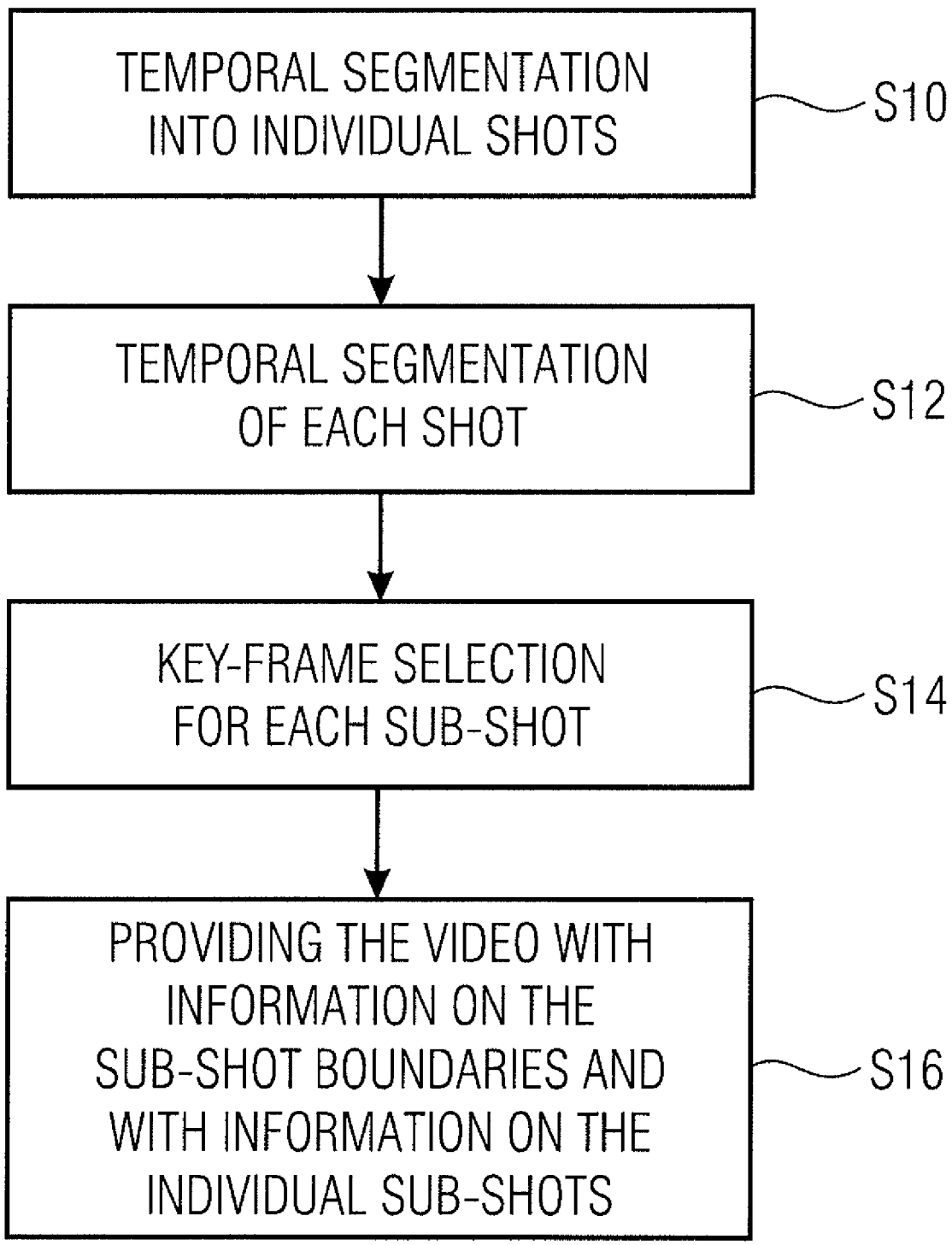
FIG. 7 shows a flow chart of a method for selecting keyframes for retrieving picture contents of a video in accordance with an exemplary embodiment.

In other words, it is possible with the description of above exemplary embodiments of FIGS. 1-5 to proceed to a selection of key-frames for retrieving picture contents of a video, as shown in FIG. 7. In a step S10 is first performed a temporal segmentation of the video into individual shots. The step S10 thus includes the detection of shot boundaries, i.e. the detection of boundaries between continuously recorded sections of a video, which can appear for example as abrupt changes in picture content or abrupt changes in camera act.

Thereupon, in a following step S12 is performed a temporal segmentation of each of the shots determined in step S10 into individual sub-shots, so that each sub-shot includes a sequence of successive video pictures of the shot, which exhibits only a small change in picture content. The step S12 itself can include, as mentioned above, the execution of the threshold-value algorithm, the cluster algorithm or the motion algorithm. Then, in a step S14, a key-frame selection is performed for each sub-shot, exactly one video picture, representing the picture content of the respective sub-shot, among the video pictures of the respective sub-shot being, for each sub-shot, associated with the respective sub-shot. The result is thus a sequence of key-frames, which describe the content of the video semantically exactly and nevertheless if possible not redundantly. The key-frame selection in step S14 for each sub-shot can be performed, as mentioned above, in the same, for example deterministic, way for each sub-shot. For example, the selection as the key-frame of the respective sub-shot can fall on the first, the central, the last or any other picture of each sub-shot, or a random selection as key-frame of the respective sub-shot among the pictures of each sub-shot can however take place. In particular, it is possible for the selection to be performed independently from the picture content of the individual sub-shots, although a dependence of the selection is of course also possible. For example, the selection could occur, depending on the picture content, among several different deterministic selection possibilities that select, independently from the picture content, among the frames.

The reason for the simple key-frame selection in step S14 resides in that the method in accordance with FIG. 7 provides not only the sequence of key-frames, but also a segmentation of the video into sub-shots, which, in turn, show, as regards the picture content, internally only a small change. To illustrate this, it is shown in FIG. 7 that the steps S10 to S14 can also be followed by a step of providing the video with information on the sub-shot boundaries and with information on the individual sub-shots S16, whereby the information on the individual sub-shots can, in turn, be provided with an index, which permits a clear association to one of the sub-shots. The step S16 can for example include providing the video with a side-information block. Furthermore, the step S16 can include providing the video with information, which divides the video into shots and/or scenes, the division being performed using the indices, which can be clearly associated with the sub-shots.

Figure 8:
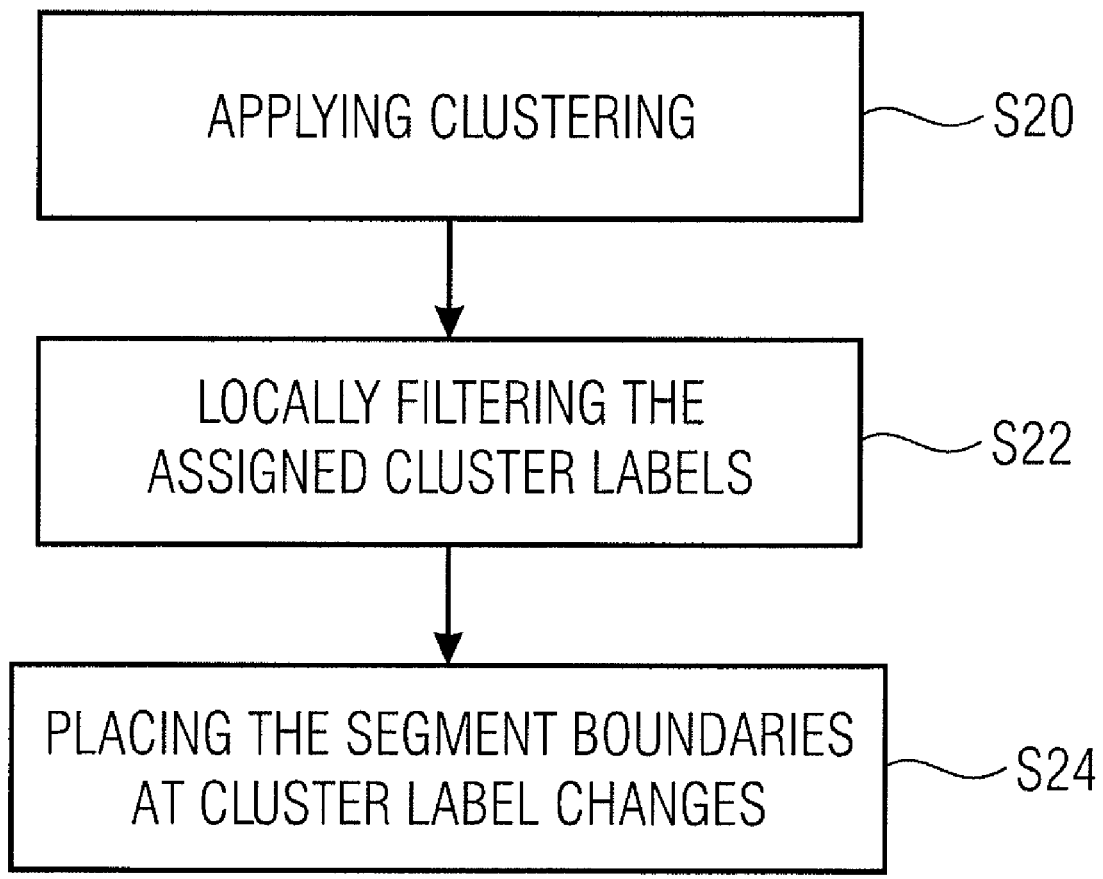
FIG. 8 shows a flow chart of a method for a temporal segmentation of a sequence of successive video pictures into shorter video sections with a small visual variation in accordance with an exemplary embodiment.

FIG. 8 shows once again more in detail the cluster algorithm in accordance with an exemplary embodiment. In particular, FIG. 8 shows a temporal segmentation of a sequence of successive video pictures into shorter video sections with small or smaller visual variation within the individual video sections, whereby the sequence of successive video pictures, which is to be segmented, must not necessarily be a shot, as was the case, in the preceding exemplary embodiments but can rather be any sequence of successive video pictures. In the latter more general case, the procedure in accordance with FIG. 8 provides a segmentation, which segments or divides the sequence of successive video pictures semantically or in accordance with the picture content. The method in accordance with FIG. 8 starts at step S20 by applying a clustering to the video pictures without taking into consideration the temporal order of the video pictures and using a measurable picture property of the video pictures, in order to associate the video pictures with different cluster labels in accordance with their measurable picture property. The step S20 can include the determination of the measurable picture property for each of the video pictures, e.g. the detection of the above-mentioned histogram for each video picture. Generally speaking, the measurable picture property can include a distribution of brightness values and/or a statistic variable, e.g. the central tendency or the dispersion of this distribution. The measurable properties of the video pictures create a cloud of pixels in the single- or higher-dimensional space, the use of clustering discovering accumulations or densifications in this cloud of pixels. The picture properties, which belong to a determined accumulation, form a cluster. In this way all video pictures are associated with a determined cluster among one or more clusters. For example, each video picture is associated with the cluster whose center is closest for a measurable picture property. In this way each video picture is associated with a cluster among one or more different clusters or to a cluster labeling of the respective cluster by clearly associating a cluster labeling to each cluster.

Figure 3:
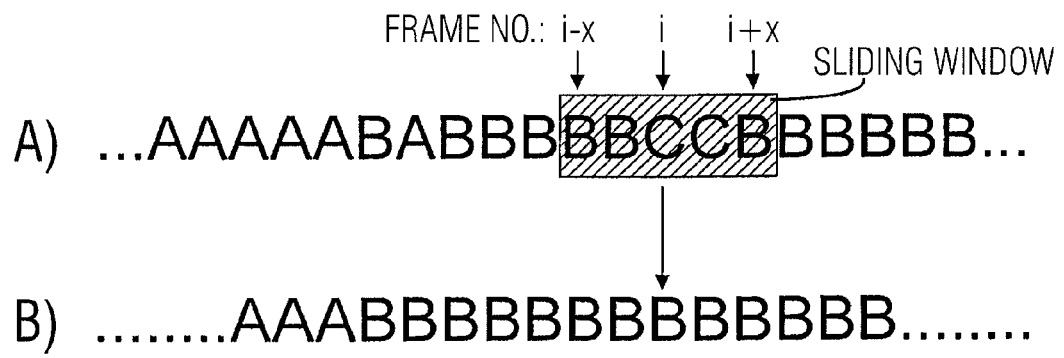
FIG. 3 shows a diagram of the majority vote filtering in the cluster algorithm.

During the association after step S20, the temporal order of the video pictures remains unconsidered. Nevertheless, from the step S20 results a sequence of cluster labels, namely the sequence of cluster labels of the sequence of video pictures. In FIG. 3, the cluster labels are shown by large letters.

Different conditions can result into video pictures of a video provisionally exhibiting other picture properties than before and afterwards. This can mean a high number of cluster-labeling changes, which is also referred to as fluctuation.

In order to reduce, in the case of such fluctuations, the high number of cluster-labeling changes in the sequence of cluster labels, a local filtering of the sequence of assigned cluster labels is then performed in a step S22. To this end can be used, as described above, for example a majority vote filter, as is also shown in FIG. 3. Alternatively or additionally can be used the temporal filter, also described above. The result in the case of using majority vote and temporal filters is a filtered sequence of cluster labels with potentially less cluster labeling changes. Potentially less means here that through filtering the number of cluster labeling changes can be reduced or remains however unchanged. In addition, the filtering results into a sequence of runs of cluster labels of a length that corresponds at least to the minimum length as established by the temporal filter. In the time filter, for example the cluster labeling of runs with a smaller length can be changed into the cluster labeling of the proceeding or following run in temporal order with respect to the mean value of which resulting from the measurable picture properties of the associated pictures the measurable picture property of the pictures within the run which is too short has the shorter distance. Alternatively, in the temporal filter, for example the cluster labeling of runs with a smaller length can be changed into the cluster labeling of the n preceding or following pictures, for example with n being 3, in the temporal order, with respect to the mean value of which resulting from the measurable picture properties of the associated pictures the measurable picture property of the pictures within the run which is too short has the shorter distance. There exist however also possibilities other than the described filters, e.g. the use of a media filter.

Figure 4:
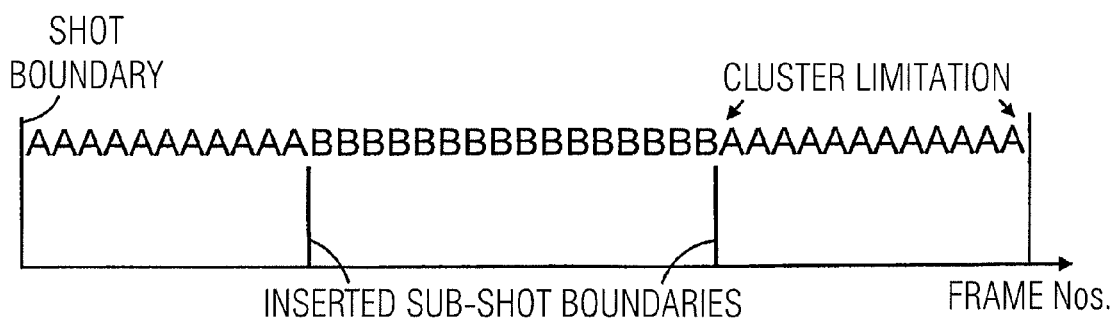
FIG. 4 shows a diagram of the setting of the sub-shot boundaries after performing the cluster algorithm.

After the filtering, the segment boundaries are set, in a step S24, at locations of a change of cluster labeling in the temporal order of the video pictures, as indicated for example in FIG. 4. From each of the successive runs of cluster labels is thus defined a segment.

Figure 9:
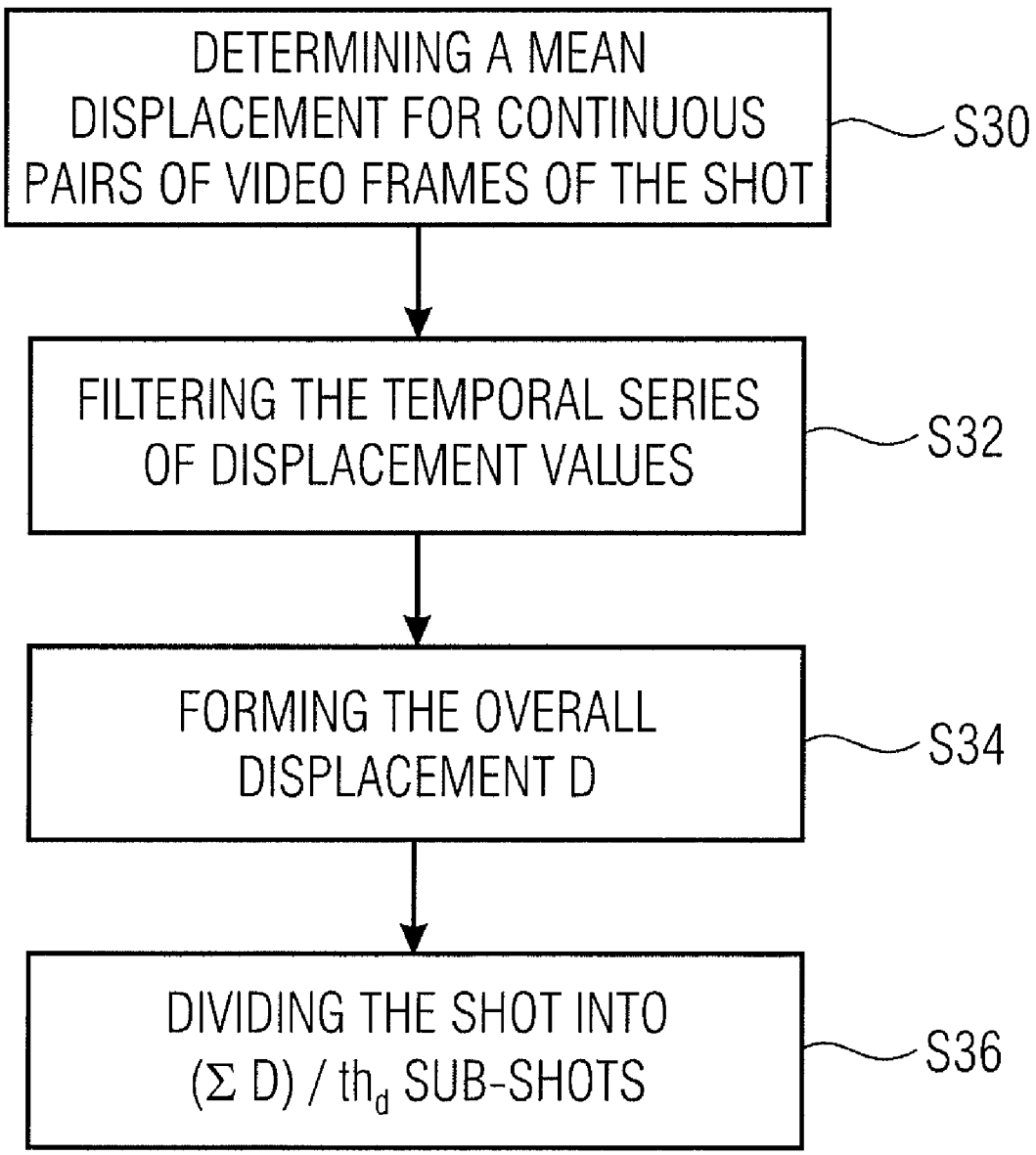
FIG. 9 shows a flow chart of a method for a temporal segmentation of a shot into sub-shots in accordance with an exemplary embodiment.

Finally is described, with reference to FIG. 9, the motion algorithm in accordance with an exemplary embodiment. In other words, FIG. 9 describes a temporal segmentation of a shot into sub-shots. The method starts, in a step S30, with the determination of a mean displacement for continuous or successive pairs of video pictures of the shot. The displacement per video picture, determined in step S30, indicates for example, the amount by which the pixels of a video picture are displaced with respect to the respective other, following or preceding, video picture of the respective pair of video pictures. The determination in step S30 is performed using a motion-vector field between the video pictures of the respective continuous pair of video pictures. The displacement is calculated for one or several directions of motion. As mentioned above, these directions of motion can include a horizontal direction of motion, a vertical direction of motion or a zoom direction, i.e. directions of motion in the video, which result from changes of camera acts. In other terms, from the motion-vector field in step S30 is formed a sum for only the component of the motion vectors mv that points into the direction corresponding to the corresponding camera motion. To this end is used for example a vector field of model vectors v(i,j), which describes the respective camera motion or the effect of the camera motion in the video. For the horizontal camera motion, the model-vector field is for example designed so that, in each block, a model vector points to the left or to the right or horizontally in a common direction. The model vectors can for example be unitary vectors. The sum for the scalar products of the motion vectors and model vectors can be limited to blocks, which are not located at the edge of the pictures of the video from which the corresponding blocks could, due to the camera motion, move out of the picture. For the vertical camera motion, the model-vector field could for example, as shown in FIG. 5b, have simply model vectors that point vertically, for example upward or downward. For the zoom motion, the model-vector field would describe for example the escape of the pixels that occurs from the center of the picture to the outside. The model vectors would thus point away from the center of the picture, as also shown in FIG. 5c. In the zoom direction, the sum for the scalar products could be omitted not only at the edge, but also in a central region of the picture, since it can happen that the video does not have the optical axis and, hence, the vanishing point in the center. In addition, the sum on the scalar products can be reduced to the motion vectors of the video that are present for blocks having a sufficient structure or edge marking, in order to guarantee that the motion prediction, which led to the motion vectors, is also representative for the motions of the objects in the video, and is not merely an artifice of the optimization of the compression rate, as can be the case with structurally poorly marked picture components, e.g. a water surface or a homogeneous sky. The result of step S30 is thus a series of displacement values for each direction of motion, each series having a displacement value per picture.

In step S32, the temporal series of displacement values of the one or several directions of motion are then filtered by means of a low-pass filter, in order to obtain filtered displacement values per direction of motion. The low-pass filter can include, as mentioned above, for example a mean-value filter. Then, in a step S34 is formed for all video pictures of the shot an overall displacement D based on a sum of the amounts of the displacement values of all directions of motion. The result of the step S34 is thus a series of overall displacements D. In step S36, the shot is then subdivided into $(\Sigma D)/\text{th}_d$ sub-shots, $\text{th}_d$ being a predefined limit value and $\Sigma D$ meaning the sum of the overall displacements D on all pictures. The division in step 36 is performed so that in each sub-shot the sum of the overall displacements D of the pictures within the respective sub-shot is about the same for all sub-shots.

Although the corresponding key-frame selection or segmentation has been described above, with reference to FIGS. 7 to 9, based on process steps, it is pointed out that the corresponding FIGS. 7 to 9 represent of course at the same time also the construction of a corresponding device for key-frame selection or segmentation in that the individual blocks S## represent for example the individual means that perform the corresponding functions. These means can for example be components of a computer program or be components of an ASIC or another hardware or also components of a FPGA or another programmable logic component.

Finally, it is also pointed out that the above methods for the segmentation of shots can be combined with each another. For example, all three methods are applied in parallel to one or several shots, and from the resulting segmentation, one is selected in accordance with predefined criteria, e.g. the one with most or the one with fewest sub-shots. Furthermore, it is possible to define among the procedures a priority order, in that they are started with the first method in the order, in order to obtain a first segmentation, whereby it is then checked whether it meets a predefined criterion, after which, in case of non-fulfillment, the next method in accordance with the priority order is applied on the shot, in order to obtain a second segmentation, which is then, in turn, checked, in order to have recourse, in case of non-fulfillment, to the third method for application on this shot. Other combinations can of course also be contemplated. For example, a calculated overall displacement between two pictures could affect their distance during clustering.

In particular, the attention is drawn on the fact that depending on the circumstances the scheme in accordance with invention can also be implemented in software. The implementation can occur on a digital storage medium, in particular a disk or a CD with electronically readable control signals, which can cooperate with a programmable computer system so that the corresponding method is performed. Generally, the invention thus also consists of a computer program product with a program code stored on a machine-readable carrier for performing the method in accordance with the invention when the computer program product is executed on a computer. In other words, the invention can be thus be implemented as a computer program with a program code for performing the method when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for temporal segmentation of a sequence of successive video pictures into shorter video sections that comprise little visual variation, comprising:
    determining a measurable picture property for each video picture;
    applying a clustering to the video pictures without taking into consideration the temporal order of the video pictures, by using the measurable picture property of the video pictures, in order to assign each video picture to a respective one of different cluster labels in accordance with their measurable picture property, and so as to obtain a sequence of cluster labels sequentially ordered in accordance with the temporal order of the video pictures;
    filtering, by means of a majority vote filter, the sequence of cluster labels so that a number of changes in cluster labeling is reduced along the temporal order of the video pictures, and
    after the filtering, placing segment boundaries between video pictures corresponding to locations where the cluster labeling changes in the filtered sequence of cluster labels,
    wherein the applying is performed such that the clustering involves a k-means algorithm or hierarchical clustering according to which a measurable picture property of the video pictures and a distance function therebetween is defined, and the clustering merely depends on distances between the measurable picture properties in order to determine clusters with, relating to the number of clusters, minimum average distance between the measurable picture properties within the respective clusters.

2. The method according to claim 1, wherein the clustering includes a k-means algorithm, and the measurable picture property is a histogram with i bars, and the bars are normalized before applying the k-means algorithm, so that the sum of all i bars is 1, and the measurable picture property may be interpreted as an i-dimensional vector in the Euclidean space.

3. The method according to claim 1, the method comprising:
    temporal segmentation of a video into individual shots, each shot including a sequence of successive video pictures taken by a single camera act without interruption, and applying, performing a majority vote filtering, performing a time filtering and placing being performed for each sequence of successive video pictures.

4. The method according to claim 1, wherein the filtering comprises:
    performing a majority vote filtering, after which a minority cluster labeling for a video picture i is transposed into a majority cluster labeling of the video pictures that are situated by x video pictures before and after the video picture i in the temporal order of the video pictures, and
    performing a temporal filtering as a function of a given number k, so that for less than k video pictures which are successive in the temporal order and comprise the same cluster labeling, the cluster labeling is transposed into the cluster labeling of the video pictures with the higher mean similarity which are situated before or after, the similarity being determined by means of a distance function for the measurable picture property of the video pictures.

5. The method according to claim 1, wherein the clustering involves a k-means clustering.

6. A device for temporal segmentation of a sequence of successive video pictures into shorter video sections with a small visual variation, with:
    a clusterer configured to determine a measurable picture property for each video picture and apply a clustering to the video pictures without taking into consideration the temporal order of the video pictures by using a measurable picture property of the video pictures, in order to assign each video pictures to a respective one of cluster labels in accordance with their measurable picture property, and so as to obtain a sequence of cluster labels sequentially ordered in accordance with the temporal order of the video pictures;
    a majority vote filter configured to filter the sequence of cluster labels so that a number of changes in cluster labeling is reduced along the temporal order of the video pictures, and
    a boundary segmenter configured to place, after the local filtering, segment boundaries between video pictures corresponding to locations where the cluster labeling changes in the filtered sequence of cluster labels,
    wherein the clusterer is configured such that the clustering involves a k-means algorithm or hierarchical clustering according to which a measurable picture property of the video pictures and a distance function therebetween is defined, and the clustering merely depends on distances between the measurable picture properties in order to determine clusters with, relating to the number of clusters, minimum average distance between the measurable picture properties within the respective clusters.

7. The device according to claim 6, wherein the clustering involves a k-means clustering.

8. A non-transitory computer-readable medium, on which is stored a computer program comprising a program code for performing the method for temporal segmentation of a sequence of successive video pictures into shorter video sections that comprise little visual variation, comprising:
    determining a measurable picture property for each video picture;
    applying a clustering to the video pictures without taking into consideration the temporal order of the video pictures, by using the measurable picture property of the video pictures, in order to assign each video pictures to a respective one of different cluster labels in accordance with their measurable picture property, and so as to obtain a sequence of cluster labels sequentially ordered in accordance with the temporal order of the video pictures;

filtering, by means of a majority vote filter, the sequence assigned cluster labels so that a number of changes in cluster labeling is reduced along the temporal order of the video pictures, and after the local-filtering, placing segment boundaries at locations of a change in cluster labeling in the temporal order of the video pictures when the computer program runs on a computer and/or a corresponding digital or analog component, wherein the applying is performed such that the clustering involves a k-means algorithm or hierarchical clustering according to which a measurable picture property of the video pictures and a distance function there between is defined, and the clustering merely depends on distances between the measurable picture properties in order to determine clusters with, relating to the number of clusters, minimum average distance between the measurable picture properties within the respective clusters.

9. A method for temporal segmentation of a sequence of successive video pictures into shorter video sections that comprise little visual variation, comprising:

determining a measurable picture for each video picture;

applying a clustering to the video pictures without taking into consideration the temporal order of the video pictures by using the measurable picture property of the video pictures, in order to assign each video picture to a respective one of different cluster labels in accordance with their measurable picture property, and so as to obtain a sequence of cluster labels sequentially ordered in accordance with the temporal order of the video pictures;

filtering by means of a majority vote filter, the sequence of cluster labels so that a number of changes in cluster labeling is reduced along the temporal order of the video pictures, and after the filtering, placing segment boundaries between video pictures corresponding to locations where the cluster labeling changes in the filtered sequence of cluster labels, wherein the clustering involves a k-means or hierarchical clustering which treats the video pictures without taking into consideration the temporal order of the video pictures.

10. The method according to claim 9, wherein the clustering involves a k-means clustering.

11. The device for temporal segmentation of a sequence of successive video pictures into shorter video sections with a small visual variation, with:

a clusterer configured to determine a measurable picture property for each video picture and apply a clustering to the video pictures without taking into consideration the temporal order of the video pictures and by using a measurable picture property of the video pictures, in order to assign each video pictures to a respective one of cluster labels in accordance with their measurable picture property, and so as to obtain a sequence of cluster labels sequentially ordered in accordance with the temporal order of the video pictures;

a majority vote filter configured to filter the sequence of cluster labels so that a number of changes in cluster labeling is reduced along the temporal order of the video pictures, and a boundary segmenter configured to place after the local filtering, segment boundaries between video pictures corresponding to locations where the cluster labeling changes in the filtered sequence of cluster labels, wherein the clusterer is configured such that the clustering involves a k-means or hierarchical clustering which treats the video pictures without taking into consideration the temporal order of the video pictures.

12. The device according to claim 11, wherein the clustering involves a k-means clustering.

* * * * *